United States Patent
Syvenkyy (10) Patent No.: US 12,332,402 B2
(45) Date of Patent: Jun. 17, 2025

(54) MULTI-CHANNEL PROGRAMMABLE DETECTION SENSOR

(71) Applicant: Photon Control Inc., Richmond (CA)

(72) Inventor: Yuriy Syvenkyy, Richmond (CA)

(73) Assignee: Photon Control Inc., Richmond (CA)

(*) Notice: Subject to any disclaimer, the term of this patent is extended or adjusted under 35 U.S.C. 154(b) by 333 days.

(21) Appl. No.: 17/817,119

(22) Filed: Aug. 3, 2022

(65) Prior Publication Data
US 2022/0381943 A1     Dec. 1, 2022

Related U.S. Application Data

(63) Continuation of application No. PCT/CA2021/050174, filed on Feb. 18, 2021.

(60) Provisional application No. 62/978,527, filed on Feb. 19, 2020.

(51) Int. Cl.
G01V 8/12     (2006.01)
G01S 17/04    (2020.01)

(52) U.S. Cl.
CPC ............ G01V 8/12 (2013.01); G01S 17/04 (2020.01)

(58) Field of Classification Search
CPC .................. G01V 8/12; G01S 17/04
See application file for complete search history.

(56) References Cited

U.S. PATENT DOCUMENTS

| | | | |
|---|---|---|---|
| 5,281,810 A | 1/1994 | Fooks et al. | |
| 5,324,931 A * | 6/1994 | Fooks | G01V 8/12 250/221 |
| 5,532,472 A * | 7/1996 | Furuta | G01V 8/12 250/221 |
| 2005/0094920 A1 | 5/2005 | Kamei et al. | |
| 2011/0109373 A1 | 5/2011 | Chen et al. | |
| 2016/0178794 A1 | 6/2016 | Rollins | |
| 2020/0363513 A1* | 11/2020 | Lin | G01S 7/4861 |

FOREIGN PATENT DOCUMENTS

| | | |
|---|---|---|
| CN | 1519784 A | 12/2008 |
| CN | 105319160 A | 2/2016 |
| CN | 106291568 A | 1/2017 |
| CN | 107248696 A | 10/2017 |
| JP | H06 177738 A | 6/1994 |
| JP | 2014131170 A | 7/2014 |

(Continued)

OTHER PUBLICATIONS

Search Report issued for Singapore counterpart application No. 11202251582K dated Jun. 24, 2024 (2 pages).

(Continued)

*Primary Examiner* — Tony Ko
*Assistant Examiner* — Don J Williams
(74) *Attorney, Agent, or Firm* — Edward Scott Trask (57) ABSTRACT

Single board multi-channel programmable detection sensor is disclosed. The sensor has a processor operatively connected to the emitter driver, and a photodetector for controlling one or more operational parameters of the sensor in response to a program. Sensor outputs the TTL signal when desired level of light attenuated or transmitted through the system of fiber optics sensors. The processor sets triggering levels of the signal detected by the sensor in analog fast comparator circuit to threshold based on the signal difference pre-set and actual values.

20 Claims, 7 Drawing Sheets

(56) References Cited

FOREIGN PATENT DOCUMENTS

| | | |
|---|---|---|
| JP | 2018152716 A | 9/2018 |
| TW | 557357 B | 10/2003 |

OTHER PUBLICATIONS

Written Opinion issued for Singapore counterpart application No. 11202251582K dated Jun. 25, 2024 (7 pages).
International Search Reporting issued in corresponding PCT Application No. PCT/CA2021/050174; search completed Apr. 27, 2021.
Supplementary European Search Report issued in related EP Application No. 21756931; search completed Jan. 22, 2024.
Search Report for CN counterpart application No. 202180013846.7 dated Dec. 21, 2024 (2 pages).
Office Action report issued in JP counterpart application No. 2022-549642 dated Mar. 4, 2025. (24 pages).

* cited by examiner

MULTI-CHANNEL PROGRAMMABLE DETECTION SENSOR

CROSS-REFERENCE TO RELATED APPLICATION(S)

This application is a Continuation of PCT Application No. PCT/CA2021/050174 filed on Feb. 18, 2021, which claims priority to U.S. Provisional Patent Application No. 62/978,527 filed on Feb. 19, 2020, the contents of which are incorporated herein by reference in their entirety.

TECHNICAL FIELD

The following relates generally to detection sensors and more particularly to a multi-channel programmable detection sensor that can be implemented on a single board, provide fast response time, and be compatible with thru-beam and reflective fiber optic sensors, for example in contrast applications.

BACKGROUND

Object detection sensors, and particularly those based upon photoelectric principles, are well known, with several options being available. Such sensors are widely used in industry for a variety of measurement and control functions. An example of such uses is the detection of an object on a conveyor belt. The photoelectric sensor generates a modulated light beam that is periodically interrupted by the object to be detected. The sensor has a light receiving device, which receives the light that is returned to the sensor. The light returned to the sensor is a measure of the presence or absence of the target object. The sensor also includes circuitry which provides an electronic signal representing the light returned to the photosensor.

In a typical application when the object interrupts the light beam this may be referred to as the "target" state of the photosensor. When the light beam is uninterrupted the photosensor may be referred to as being in the "background" state. In other applications the two states may correspond to two targets each having a different reflectivity. There is a difference in the level or magnitude of the electrical signal generated by the photosensor in the target state when compared to the background state. This difference may be referred to as the "contrast". The photosensor also includes electronic circuitry for producing an output signal that may be used as a control signal. For example, the photosensor may be used to detect wafers during a wafer processing cycle with the output signal of the photosensor being used to detect when wafers pass.

The output of the photosensor changes when the detected light changes from the target state to the background state and vice versa. The signal level at which the output changes is referred to as the signal threshold. Generally, this threshold signal level is preset by the photosensor manufacturer.

Prior art detection sensors have been provided with mechanisms or devices to adjust the operational mode of the sensor as well as mechanisms to adjust certain operational parameters of the sensor. Among the characteristics that are adjustable in the prior art photosensors is the gain of the amplifier that amplifies or boosts the electronic signal that is generated as a result of the light that is returned to and received by the sensor.

In addition, the light source driving current can be adjusted to obtain the best detection conditions, increasing sensor dynamic range and increasing signal to noise ratio. Adjustment of the sensor operating modes and operational characteristics is required so that the user can establish proper signal amplification and output operations. Generally, in prior solutions, the sensors have been provided with a plurality of switches that are manually operable to set the various operational modes and characteristics of the sensor.

More recently, detection sensors have been available that have microcontrollers that are capable of automatically varying the amplifier gain, measuring the value of the electrical signal in both the target and background states at each gain level, comparing the differences in the signal at each gain level, and setting the amplifier gain for the particular application. An example of one such sensor is disclosed in U.S. Pat. No. 5,281,810. This type of sensor is particularly useful when the signal difference between the target and background conditions is relatively small. These types of applications are called low contrast applications which require careful amplifier gain adjustment so that the amplifier does not saturate. This also enables the contrast or difference between the two conditions to be maximized. In this new generation of sensor there is typically a manual override so that the operator can adjust the gain to a setting that maximizes the excess gain performance of the sensor when the user determines that the conditions require or will allow a maximum gain setting. This new generation of sensor also typically has multiple switch devices to set the various operating parameters and operating modes of the sensor.

There has been continuing effort to reduce the size of detection sensors in order to minimize the space required for installation of them. As the sensor becomes smaller, the space available for switches and adjustment mechanisms is reduced. Thus, a system that enables multiple function programming of the sensor with minimal switching devices would be advantageous.

It is an object of the following to address at least one of the above-mentioned drawbacks or disadvantages.

SUMMARY

The following relates to an object detection sensor. Such sensors are commonly used in industrial and commercial applications to detect the presence, absence or condition of an object. In particular, the following relates to a detection sensor operating under photoelectric principles although other types of sensors, such as ultrasonic, are contemplated within its scope. More specifically, the following relates to an object detection sensor that may be easily and quickly programmed by the user to establish desired and optimum operational modes and parameters of the sensor.

In one aspect, there is provided a detection sensor comprising an electronic board comprising a plurality of independent channels, each channel comprising an emitter and a detector, wherein each channel is programmable by a processor.

BRIEF DESCRIPTION OF THE DRAWINGS

Embodiments will now be described with reference to the appended drawings wherein.

DETAILED DESCRIPTION

The following provides a detection sensor with an emitter for generating a light signal intended to be blocked by or reflected from an object; and a detector for generating an electronic signal that represents the presence, absence or condition of the object based upon the signal (e.g., reflected/through light) returned to the sensor. A single board with multiple independent channels (each with an emitter and detector) provides multi-function programming of the sensor channels and generates a programming signal that is input to a processor. The processor is operatively connected to the emitter, detector, and a switching device for controlling one or more operational characteristics of the sensor in response to the programming signal.

The switching device may include a single switch such as a single manually operable push button or software controlled through a series of commands sent from an external device, such as a computer or microcontroller. The detector which generates the electronic signal further has a variable gain amplifier and the electronic signal has a first level representing a first state of the sensor and a second level representing a second state of the sensor. These two states correspond to what may be referred to as the target state and the background state, respectively. The processor compares the level of the electronic signal in the two states and provides a signal to adjust the gain of the variable gain amplifier to an optimum gain setting. The processor selects the gain setting to either maximize the low contrast gain or maximize the high excess gain performance of the sensor. The processor also establishes the sensor signal threshold and hysteresis values based on the comparison of the electronic signal in the two states.

In an implementation, there may be provided a photoelectric detection sensor with a light emitter to provide constant light signals that are intended to reflect from, or be blocked by, a target object. The sensor includes a photodetector to receive the returned light and an electronic circuit to generate a signal representing the returned light. The electronic circuit has at least two amplification stages with different amplification gains. A microcontroller can be used as the processor, with a digital to analog converter (DAC) to set an LED driving current that achieves satisfactory light conditions. The sensor can be provided with an LED for each independent channel, as well as two (or more) LEDs indicating system status.

The following system therefore provides a multi-functional detection sensor programmable by sending electrical signals to an onboard processor (e.g., microcontroller) or directly to the light source control circuit, to multiple photodetector signal amplification stages, and to a detector circuit, e.g., an analog comparator circuit.

Figure 1A:
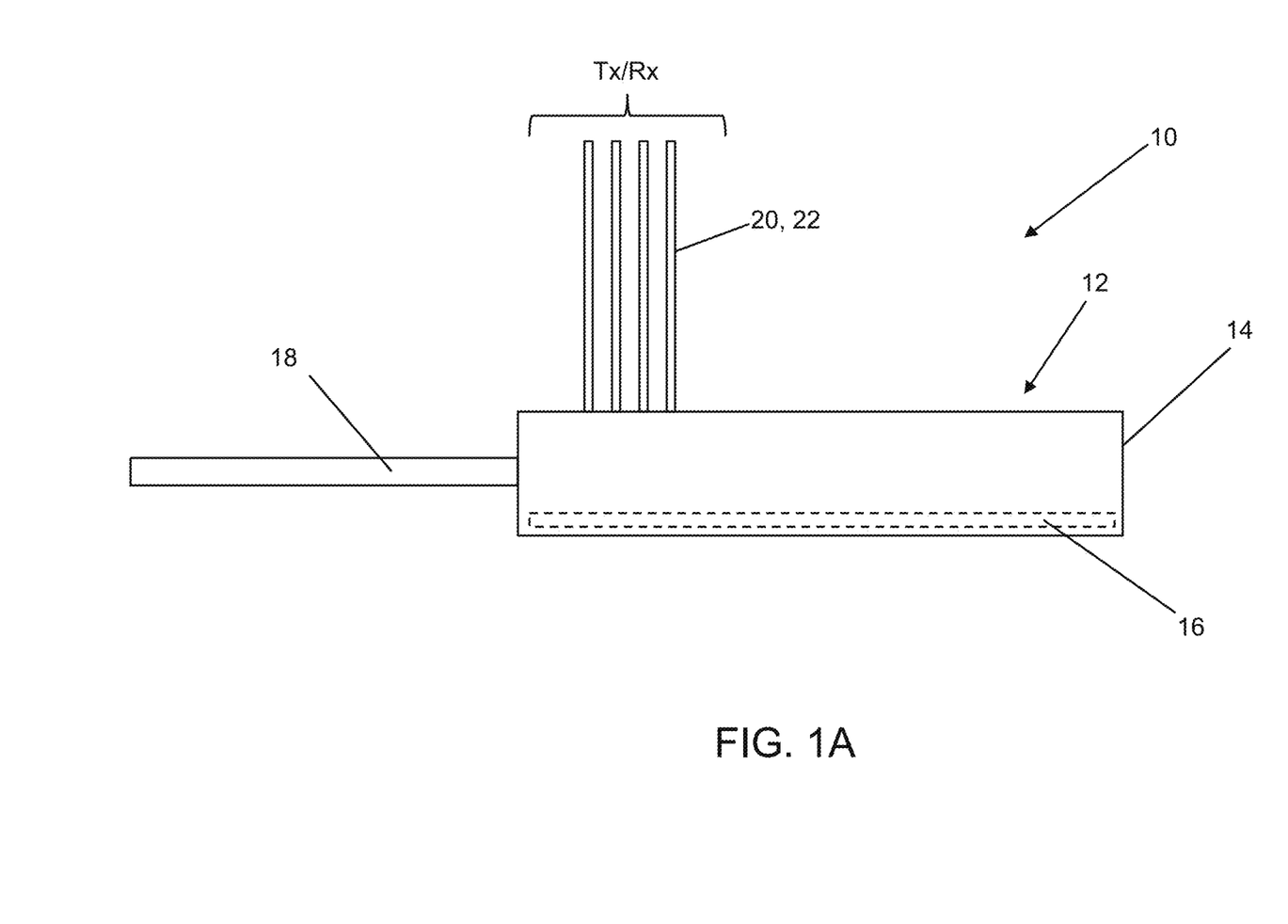
FIGS. 1A, 1B, 1C, 1D and 1E are schematic diagrams of optical sensing applications.
Figure 1B:
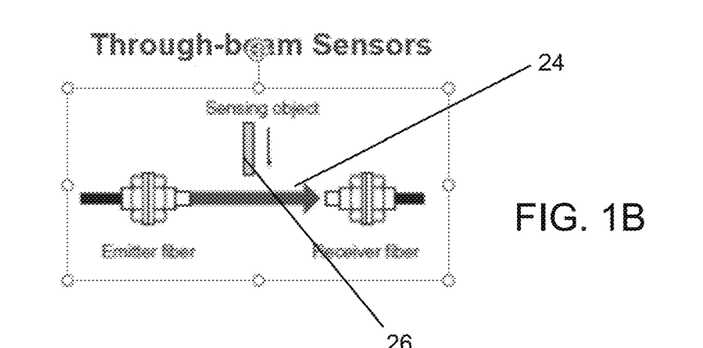
Figures 1C, 1E:
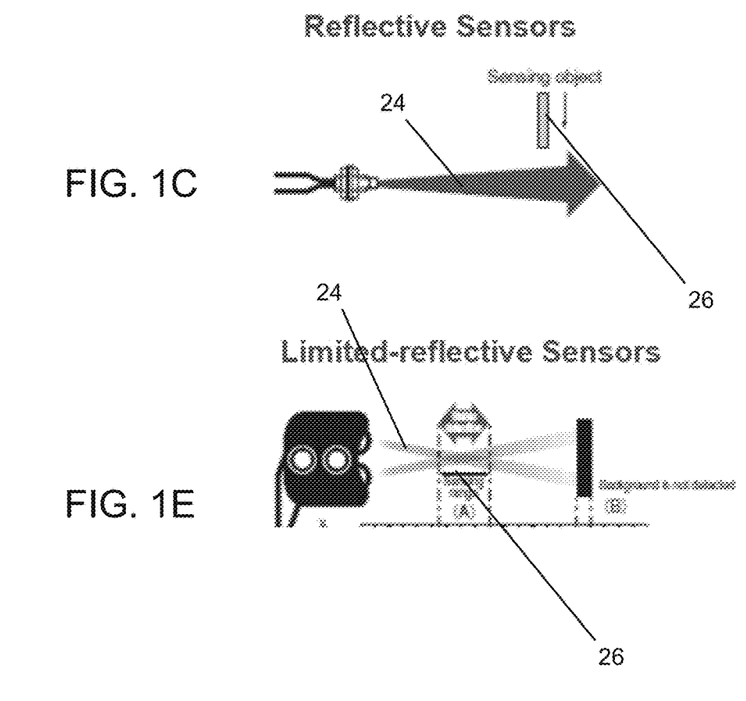
Figure 1D:
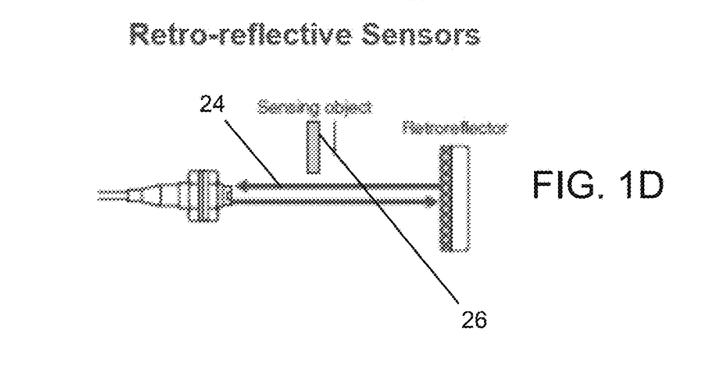

Turning now to the figures, FIG. 1A illustrates an example of an optical sensing application 10. The application 10 in this example uses a multi-channel programmable detection sensor 12 (or "multi-channel sensor" 12 for brevity) to detect the presence or absence of an object, to detect a difference in surface reflection or contrast between surface, or any other suitable optical sensing application. The multi-channel sensor 12 includes a housing 14 that contains an electronics board 16 that is used to generate a light source and detect a signal as explained above. The multi-channel sensor 12 in this example is connected to a control line 18 that can be used by an external computer or system (not shown) to operate the multi-channel sensor 12 and receive data therefrom. Setting thresholds using the control line 18 can be done using, for example, a tactile push button, a software interface or other switch. Fiber optic transmit cables 20 and fiber optic receive cables 22 may be fed into the housing 14 to connect to the electronics board 16 for providing source(s) of light and for receiving detected light. It can be appreciated that the housing 14 can include light insulating compartments to prevent light crosstalk between channels. The control line 18 can be provided using an interface electrical connector attached to the side of the housing 14. Various examples of the application 10 are shown in FIGS. 1B through 1E, e.g., a through-beam sensor (FIG. 1B), a reflective sensor (FIG. 1C), a retro-reflective sensor (FIG. 1D), and a limited-reflective sensor (FIG. 1E). In these cases, a sensing object 26 is moving relative to the sensor and thus can be detected by one or more light sources 24.

Figure 2:
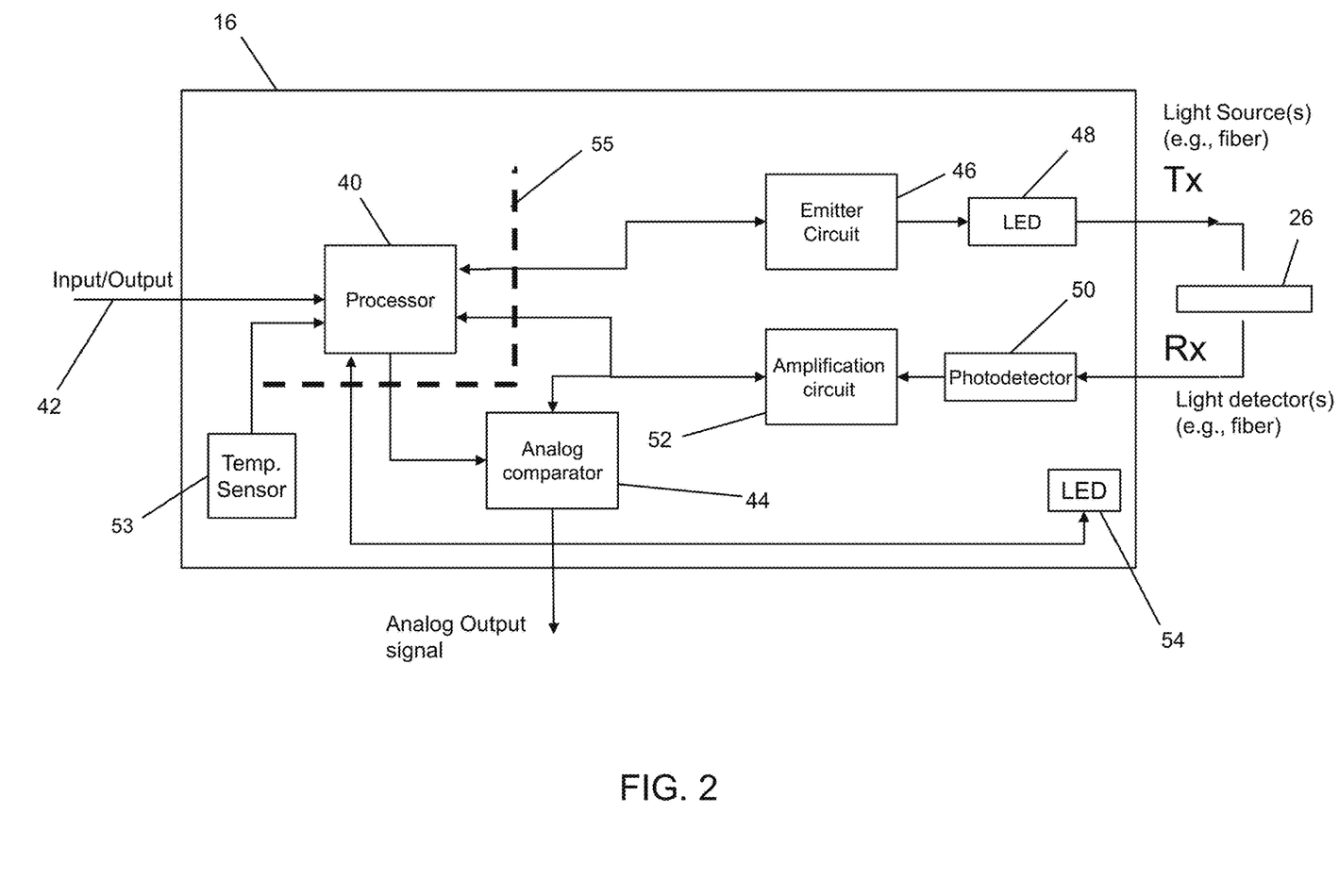
FIG. 2 is a schematic diagram of a multi-channel sensing board.
Figure 3:
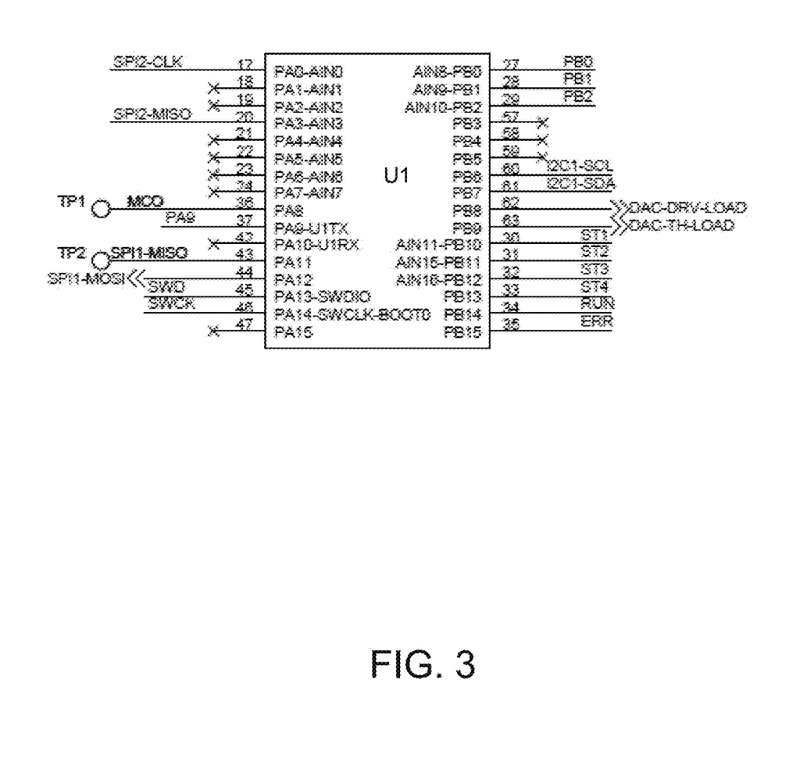
FIG. 3 is a schematic diagram of an example of a microcontroller for the multi-channel sensing board.
Figure 4:
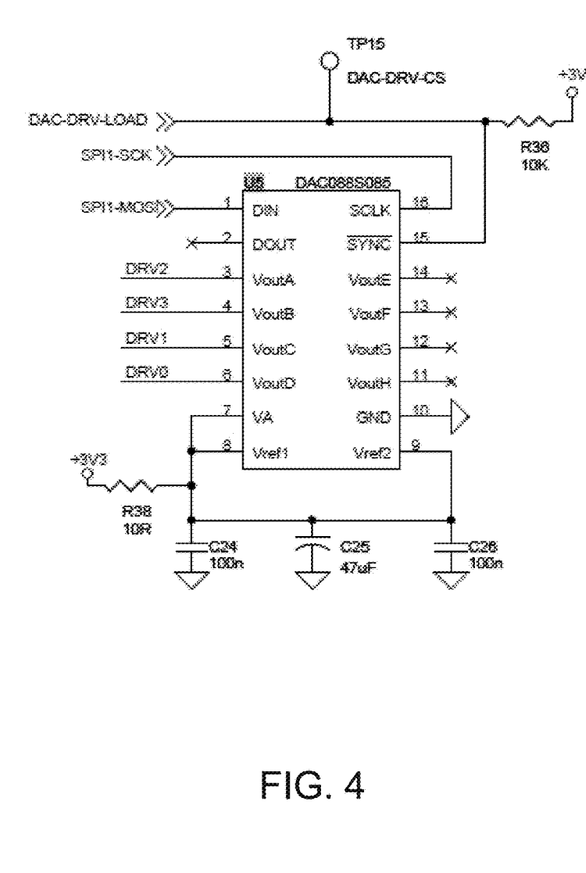
FIG. 4 is a circuit schematic of an example of a DAC for the multi-channel sensing board.
Figure 5:
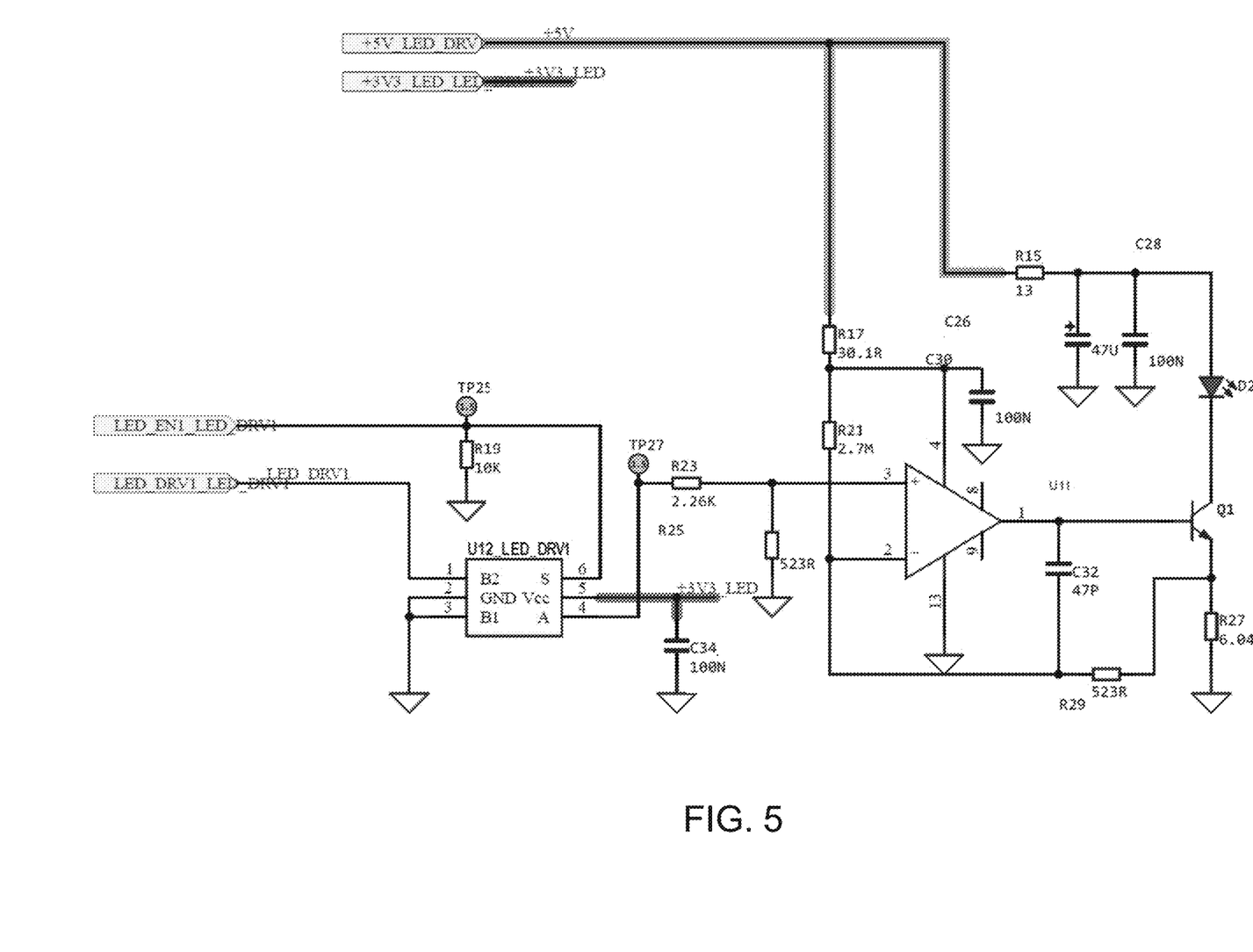
FIG. 5 is a circuit schematic of an example of a control circuit (e.g. a light-emitting diode (LED) driving circuit) for the multi-channel sensing board.

FIG. 2 provides an example of a configuration for the electronics board 16. In this example configuration, a processor 40, such as a microcontroller, is provided to set parameters and communicate with the external interface, such as via an input/output line 42. The processor 40 is coupled to an emitter circuit 46, an amplification circuit 52, an analog comparator 44, and a temperature sensor 53. The board 16 can include a switching device to select one or more channels. This switching device can be a separate device (not shown) or an interface 55 for all of the channels can connect directly to the controller (e.g., the processor 40) as shown in FIG. 2. The processor 40 in this example can perform the switching between channels using firmware. Each channel includes an input to the emitter circuit 46 that regulates the current through the LED 48 and thus the light intensity through the (e.g., fiber optic) light source cable(s) 20, to provide light source signal(s) 24 via LEDs 48 in this example. The light that is interrupted or reflected by the object 26 is transmitted through the (e.g., fiber optic) light receiving cable(s) 22 and then detected by a sensor 50, e.g., a photosensor or photodetector, which is fed to an amplification circuit 52. The amplification circuit 52 generates processed signals based on the detected light of the sensor 50. The amplification circuit 52 is also coupled to the processor 40 for providing feedback for adjusting the parameters of the board 16.

Referring to FIG. 2, the processor 40 can set the threshold and send this signal to the comparator 44. The signal from amplification circuit 52 is coupled to the comparator 44, where instant decisions can be made when an output signal is sent. This allows the sensor 12 to achieve a relatively fast response. Also, signals from the amplification circuit 52 are converted from analog to digital or fed to the processor 40, which can have this function built in for diagnostics, and a feedback loop for light intensity adjustment. The LED indicator lights 54 can be connected to the processor 40 and be turned on when the threshold is reached, and the output signal is generated, or the indictor LED 54 can be driven directly from the analog comparator circuit output.

Referring now to the schematic diagrams in FIGS. 3-7, operation of the electronic board 16 in one example will be provided. The primary function of the processor 40 (e.g., using a microcontroller), is to set parameters and communicate with an external interface, as shown generally in FIG. 2.

The DAC U5 (shown in FIG. 4) is controlled from the system microcontroller U1 (shown in FIG. 3) via a SPI bus to produce an output voltage proportional to the digital code and ranging between zero and +3.3 VDC (in this example) with respect to system ground. This voltage is applied to the non-inverting input of the op-amp U11 (see FIG. 5—where the same circuit can be used for each channel and an input signal connected to a single microcontroller) via analog switch U12_LED_DRV1 and voltage divider R23, R25. This causes the op-amp to force a stable DC current through the LED D2 such that a voltage drop on current-sensing resistor R27 is equal to the voltage at the non-inverting input of the op-amp. Thus, the DC current through the LED is controlled between zero and approximately 100 mA in this example. Since light intensity of the LED is a linear function of the current, light output is controlled by the microcontroller U1. The U12 switch is used for turning the LED D2 on or off at very precise moments, as the LED_EN1 signal is connected to fast logic outputs from the microcontroller.

Light emitted by the LED is returned to the unit by way of an optical system and strikes the photodiode D7 (see FIG. 6), which produces a DC current proportional to its illumination level. This current is fed into the transimpedance amplifier U31A and converted to the DC voltage at the output (pin 1) of U31A. This voltage is filtered by the two pole low pass filter comprised of R97, C106, R94, and C104 and is fed into the voltage amplifier U28C, whose gain is determined by the feedback circuit R99, R104, R106. By switching the feedback resistors using analog switch U38, two different gain settings can be realized.

Figure 6:
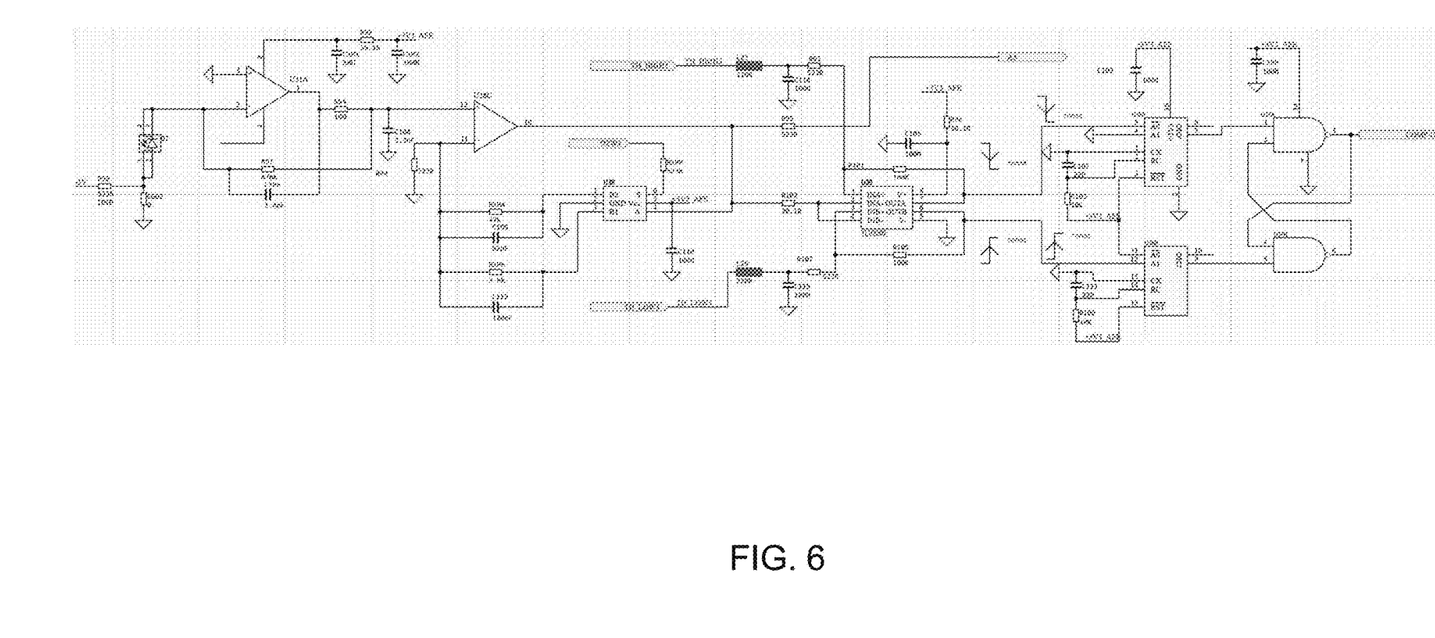
FIG. 6 is a circuit schematic of an example of a light detection for the multi-channel sensing board.
Figure 7:
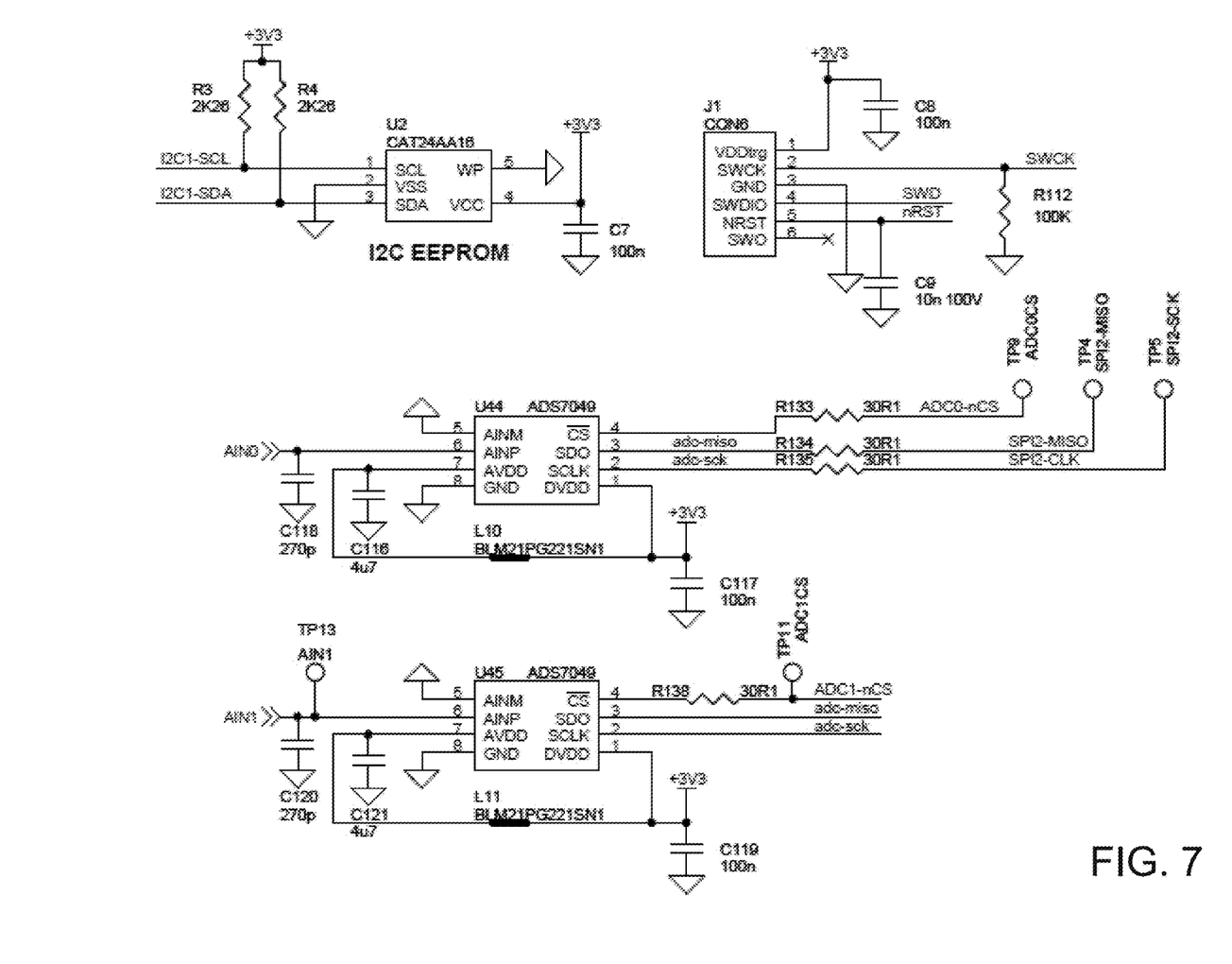
FIG. 7 is a circuit schematic of an example of a signal amplification circuit for the multi-channel sensing board.

Voltage output of the amplifier is fed into the ADC U44 (see FIG. 7) and also applied to the inputs of the window comparator U39 (shown in FIG. 6). Outputs of the comparator feeding the monostable U36 inputs and the corresponding outputs are used as inputs for an RS bistable (U37). U36 and U37 are notable, since this circuit, in conjunction with manipulating the comparator threshold levels, can offer to the comparator output additional flexibility and noise immunity. The COMP-OUT signal is further used by the logic circuit to determine the state of the sensor.

The board 16 described herein therefore incorporates multi-channel sensors which allows these channels to share some common circuitry (i.e., power supply, processor, input and output mechanisms, board, enclosure) for several channels. When compared to an assembly of individual sensors, this can achieve a reduction of cost and space savings in a particular application 10.

Moreover, unlike existing solutions, the multi-channel sensor 12 uses unmodulated light, which achieves a potentially faster reaction time (thus increased timing resolution). This is because in a modulated system the ultimate timing resolution is typically limited by modulation frequency.

Using a DAC to adjust (potentially, dynamically) the intensity of emitted light signal allows compensation for varying optical path loss and helps providing the detection circuitry with optimal input signal level.

Splitting the received signal processing between the two amplifiers (one transimpedance amplifier and the other a voltage amplifier) achieves higher bandwidth (required for fine timing resolution) and better accuracy than would be possible with a single stage design using similar parts. The voltage amplifier also provides a convenient mechanism for gain adjustment.

Using a separate adjustment (i.e., the ADC+processor) and detection (hardware comparators and output logic) circuitry and methods for each channel achieves both convenience (including, potentially, a fully automatic drive level, amplification and detection thresholds setup) and high speed operation.

Using two different and adjustable detection thresholds (rising and falling) allows operation in widely varying conditions (e.g., fast and slowly moving targets). Comparators are generally used with fixed threshold hysteresis to avoid output chatter during slow changing input signals (and suppress noise to some extent), but the design described above provides fully adjustable thresholds coupled with edge-detection logic circuitry that enhances the performance.

Moreover, fully electronic controls (i.e., with no mechanical adjustments) allow for the minimization of the size of the sensor 12 and can improve its operational reliability.

The system described herein can also compensate for the effect of ambient temperature variation using firmware. Referring again to FIG. 6, due to ambient temperature changes, the LED light intensity as well as the D7 Photodiode dark current value will change. That, in effect, will translate into a modified voltage level at the output of the transimpedance amplifier U31A as the ambient temperature changes. The microcontroller, by monitoring the correspondingly proportional U28C output voltage, as well as the ambient temperature information from the temperature sensor 53 in FIG. 2 can adjust, accordingly, the current sent through the D2 LED in FIG. 5, thus maintaining the accuracy of sensor state detection over the whole environmental temperature range.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the sensor 14, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A detection sensor comprising:
a single electronic board, the single electronic board comprising a processor, a switching device provided by the processor or separately, and a plurality of independent channels operatively connected to the processor and/or the switching device, each of the plurality of independent channels comprising an emitter to provide a light source signal, and a detector to process detected light that is interrupted or reflected by an object interacting with the light source signal,
wherein each of the plurality of independent channels is separately programmable by the processor, and
wherein the switching device is configured to independently control one or more operational characteristics of the emitter and/or the detector of the detection sensor in response to a programming signal input to the detection sensor.

2. The sensor of claim 1, wherein the single electronic board further comprises a comparator to compare the detected light to one or more sensor signal thresholds.

3. The sensor of claim 2, wherein the comparator uses a plurality of different adjustable signal thresholds.

4. The sensor of claim 3, comprising a rising threshold and a falling threshold.

5. The sensor of claim 1, wherein the emitter comprises a light emitting diode (LED).

6. The sensor of claim 1, wherein the detector comprises a photodetector.

7. The sensor of claim 1, wherein the plurality of independent channels utilize unmodulated light.

8. The sensor of claim 1, wherein the single electronic board further comprises a digital to analog converter (DAC) operatively coupled to the plurality of independent channels to adjust an intensity of the light source signal.

9. The sensor of claim 8, wherein the DAC is operatively coupled to an emitter circuit to control the intensity of the light source signal.

10. The sensor of claim 1, wherein the single electronic board further comprises at least one amplification circuit to amplify a received signal from the detector, wherein the received signal is generated from the detected light.

11. The sensor of claim 10, wherein the at least one amplification circuit provides a feedback signal to the processor.

12. The sensor of claim 10, wherein the received signal is split and processed by a pair of amplifiers.

13. The sensor of claim 12, wherein the pair of amplifiers comprise a transimpedance amplifier and a voltage amplifier for gain adjustment.

14. The sensor of claim 10, wherein the processor is configured to monitor an output voltage of the at least one amplification circuit to adjust current sent through the emitter to compensate for effects of ambient temperature variation.

15. The sensor of claim 1, wherein the single electronic board comprises separate adjustment and detection circuitry for each of the plurality of independent channels.

16. A method of signal detection, comprising:
selecting one of a plurality of independent channels of a detection sensor, the detection sensor comprising a single electronic board, the single electronic board comprising a processor, a switching device provided by the processor or separately, and the plurality of independent channels operatively connected to the processor and/or the switching device, each of the plurality of independent channels comprising an emitter to provide a light source signal and a detector to process detected light that is interrupted or reflected by an object interacting with the light source signal, wherein each of the plurality of independent channels is separately programmable by the processor;
using the processor and/or the switching device to control one or more operational characteristics of the detection sensor in response to a programming signal input to the detection sensor;
providing the light source signal using the emitter of the one of the plurality of independent channels; and
receiving and processing the detected light.

17. The method of claim 16, wherein the single electronic board further comprises a comparator, the method further comprising comparing the detected light to one or more sensor signal thresholds.

18. The method of claim 17, wherein the comparator uses a plurality of different adjustable signal thresholds.

19. The method of claim 18, comprising a rising threshold and a falling threshold.

20. The method of claim 16, wherein the emitter comprises a light emitting diode (LED).

* * * * *